United States Patent Office 2,723,283
Patented Nov. 8, 1955

2,723,283

POLYESTERS OF OXYPROPYLATED GLYCOLS

Melvin De Groote, St. Louis, Mo., assignor to Petrolite Corporation, a corporation of Delaware No Drawing. Original application August 14, 1950, Serial No. 179,398. Divided and this application January 9, 1952, Serial No. 265,703

8 Claims. (Cl. 260—475)

The present invention is concerned with certain new chemical products, compounds or compositions which have useful application in various arts.

The particular compounds subsequently described herein in greater detail are hydrophile synthetic products, and more particularly, fractional esters obtained from polycarboxy acids and diols obtained by the oxypropylation of 2-ethylhexandiol-1,3. The commercial brand of this diol is sold under the name of octyleneglycol or octylene diol. Momentarily ignoring certain variants of structure which will be considered subsequently the said hydrophile synthetic products may be exemplified by the following formula:

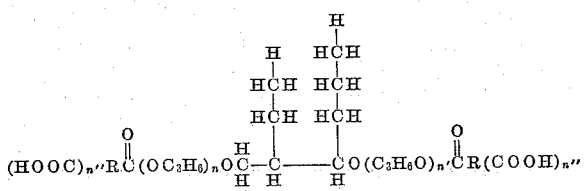

in which $n$ and $n'$ are numerals including 0 with the proviso that $n$ plus $n'$ equals a sum varying from 15 to 80; $n''$ is a whole number not over 2, and R is the radical of the polycarboxy radical

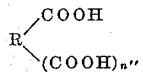

and preferably free from many radicals having more than 8 uninterrupted carbon atoms in a single group, and with the further proviso that the parent diol prior to esterification be water-insoluble and kerosene-soluble.

The products of this invention are of particular value for resolving petroleum emulsions of the water-in-oil type that are commonly referred to as "cut oil," "roily oil," "emulsified oil," etc., and which comprise free droplets of naturally-occurring waters or brines dispersed in a more or less permanent state throughout the oil which constitutes the continuous phase of the emulsion. This use of the particular products described herein is described and claimed in my copending application Serial No. 179,398, filed August 14, 1950, now U. S. Patent No. 2,602,065.

The products are also useful for separating emulsions which have been prepared under controlled conditions from mineral oil, such as crude oil and relatively soft waters or weak brines. Controlled emulsification and subsequent demulsification under the conditions just mentioned are of significant value in removing impurities particularly inorganic salts from pipeline oil.

For convenience, what is said hereinafter will be divided into four parts:

Part 1 is concerned with the preparation of the oxypropylation derivatives of the octylene glycol;

Part 2 is concerned with the preparation of the esters from the oxypropylated derivative;

Part 3 is concerned with a consideration of the structure of the diols which is of significance in light of what is said subsequently, and Part 4 is concerned with certain derivatives which can be obtained from the oxypropylated diols. In some instances, such derivatives are obtained by modest oxyethylation preceding the oxypropylation step, or oxypropylation followed by oxyethylation. This results in diols having somewhat different properties which can then be reacted with the same polycarboxy acids or anhydrides described in Part 2.

PART 1

Oxypropylation, like other oxyalkylation operations, should be carried out with due care, in equipment specially designed for the purpose and with precautions that are now reasonably well understood. Reference is made to the discussion of the factors involved in oxypropylation which appears in Patent 2,626,918, column 5 through column 8, the considerations and the technique there discussed being equally applicable to the production of the compounds of the present application. In view of this reference to Patent 2,626,918, no general discussion of the factors involved in oxypropylation is given here, and the procedure will simply be illustrated by the following examples:

Example 1a

The particular autoclave employed was one with a capacity of approximately 15 gallons, or on the average of about 120 pounds of reaction mass. The speed of the stirrer could be varied from 150 to 340 R. P. M. 8⅔ pounds of octylene glycol were charged into the autoclave along with one pound of sodium hydroxide. The reaction pot was flushed out with nitrogen. The autoclave was sealed, the automatic devices adjusted, and set for injecting a total of 50⅔ pounds of propylene oxide in a 9-hour period. The pressure regulator was set for a maximum of approximately 35 pounds per square inch. This meant that the bulk of the reaction could take place, and probably did take place, at a lower pressure. This comparatively low pressure was the result of the fact that considerable catalyst was present, the propylene oxide was added comparatively slowly and, more important, the selected temperature range was 205° to 215° F. (about the boiling point of water). The initial introduction of propylene oxide was not started until the heating devices had raised the temperature to approximately the boiling point of water. At the completion of the reaction a sample was taken and oxypropylation proceeded as in Example 2a, immediately succeeding.

Example 2a

Slightly over 52 pounds of the reaction mass identified as Example 1a, were permitted to remain in the reaction vessel and without the addition of any more catalyst approximately 43 pounds more of propylene oxide were added. The oxypropylation was conducted in substantially the same manner in regard to pressure and temperature as in Example 1a, preceding, except that the reaction was completed in 8 hours. At the end of the reaction period part of the sample was withdrawn and oxypropylation was continued as described in Example 3a, following.

Example 3a

Approximately 61 pounds of the reaction mass identified as Example 2a, preceding, was permitted to stay in the reaction vessel. 35⅔ pounds of propylene oxide were introduced during this third period. No additional catalyst was added. The conditions of reaction, as far as temperature and pressure were concerned were substantially the same as in Example 1a, preceding. The reaction time was cut down to 4¼ hours. At the completion of the reaction part of the reaction mass was withdrawn and the remainder subjected to oxypropylation as described in Example 4a, succeeding.

*Example 4a*

70 pounds of the reaction mass were permitted to remain in the autoclave. No additional catalyst was introduced. Slightly over 19 pounds of propylene oxide were introduced in the same manner as described in Example 1a, preceding. Conditions in regard to temperature and pressure were substantially the same. In this instance the oxide was introduced in 2¾ hours. At the end of the reaction period part of the sample was withdrawn and the remainder of the reaction mass subjected to further oxypropylation as described in Example 5a, succeeding.

*Example 5a*

Approximately 81¾ pounds of reaction mass were permitted to remain in the autoclave. No additional catalyst was introduced. 24 pounds of propylene oxide were introduced in the same manner as described in Example 1a, preceding. The conditions of temperature and pressure were substantially the same. The time required to introduce the oxide was 6 hours. At the completion of the reaction part of the reaction mass was withdrawn and the remainder subjected to oxypropylation as described in Example 6a, succeeding.

*Example 6a*

Approximately 78 pounds of reaction mass were permitted to stay in the autoclave. This was subjected to reaction with slightly over 12 pounds of propylene oxide. Conditions of reaction were substantially the same as described in Example 1a as far as temperature and pressure were concerned. The period required for addition of this oxide was 7 hours.

What has been said herein is presented in tabular form in Table 1 immediately following, with some added information as to molecular weight and as to solubility of the reaction product in water, xylene and kerosene.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters as described in Part 2 the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 2

As previously pointed out the present invention is concerned with acidic esters obtained from the oxypropylated derivatives described in Part 1, immediately preceding, and polycarboxy acids, particularly dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from reactants such as maleic anhydride and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

TABLE 1

| Ex. No. | Composition Before | | | Composition at End | | | | M. W. by Hyd. Determin. | Max. Temp., °F. | Max. Pres., lbs. sq. in. | Time, Hrs. |
|---|---|---|---|---|---|---|---|---|---|---|---|
| | H. C.[1] Amt., Lbs. | Oxide Amt., Lbs. | Catalyst, Lbs. | Theo. Mol. Wt. | H. C.[1] Amt., Lbs. | Oxide Amt., Lbs. | Catalyst, Lbs. | | | | |
| 1a | 8.67 | | 1.0 | 999 | 8.67 | 50.67 | 1.0 | 705 | 210-215 | 35 | 9 |
| 2a | 7.47 | 43.76 | .86 | 1,830 | 7.47 | 86.63 | .86 | 1,136 | 210-215 | 35 | 8 |
| 3a | 4.80 | 55.61 | .55 | 2,826 | 4.80 | 91.23 | .55 | 1,210 | 205-215 | 35 | 4¼ |
| 4a | 3.48 | 66.20 | .40 | 3,725 | 3.48 | 85.45 | .40 | 1,418 | 205-215 | 35 | 2¾ |
| 5a | 3.18 | 78.21 | .38 | 4,826 | 3.18 | 102.21 | .38 | 1,734 | 205-215 | 35 | 6 |
| 6a | 2.35 | 75.27 | .28 | 5,565 | 2.35 | 87.39 | .28 | 1,860 | 205-215 | 35 | 7 |

[1] The hydroxylated compound is octyleneglycol.

Example 1a was dispersible to insoluble in water but completely soluble in xylene and kerosene; Examples 2a through 6a, inclusive were all insoluble in water but completely soluble in xylene and kerosene.

The final product, i. e., at the end of the oxypropylation step, was a somewhat viscous very pale straw-colored fluid which was water-insoluble. This is characteristic of all various end products obtained in this series. These products were, of course, slightly alkaline due to the residual caustic soda employed. This would also be the case if sodium methylate were used as a catalyst.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950, to De Groote & Keiser, and particularly with one more opening to permit the use of a porous spreader if hydrochloric acid gas is to be used as a catalyst. Such device or absorption spreader consists of minute Alundum thimbles which are connected to a glass tube. One can add a sulfonic acid such as para-toluene sulfonic acid as a catalyst. There is some objection to this because in some instances there is some evidence that this acid catalyst tends to decompose or rearrange oxpropylated compounds, and particularly likely to do so if the esterification temperature is too high. In the case of polycarboxy acids such as diglycollic acid, which is strongly acidic there is no need to add any catalyst. The use of hydrochloric gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the diol as described in the final procedure just preceding Table 2.

The products obtained in Part 1 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 1 is then diluted further with sufficient xylene decalin, petroleum solvent, or the like, so that one has obtained approximately a 45% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear somewhat viscous straw-colored amber liquid so obtained may contain a small amount of sodium sulfate or sodium chloride but, in any event, is perfectly acceptable for esterification in the manner described.

It is to be pointed out that the products here described are not polyesters in the sense that there is a plurality of both diol radicals and acid radicals; the product is characterized by having only one diol radical.

In some instances and, in fact, in many instances I have found that in spite of the dehydration methods employed above that a mere trace of water still comes through and that this mere trace of water certainly interferes with the acetyl or hydroxyl value determination, at least when a number of conventional procedures are used and may retard esterification, particularly where there is no sulfonic acid or hydrochloric acid present as a catalyst. Therefore, I have preferred to use the following procedure: I have employed about 200 grams of the diol as described in Part 1, preceding; I have added about 60 grams of benzene, and then refluxed this mixture in the glass resin pot using a phase-separating trap until the benzene carried out all the water present as water of solution or the equivalent. Ordinarily this refluxing temperature is apt to be in the neighborhood of 130° to possibly 150° C. When all this water or moisture has been removed I also withdraw approximately 20 grams or a little less benzene and then add the required amount of the carboxy reactant and also about 150 grams of a high boiling aromatic petroleum solvent. These solvents are sold by various oil refineries and, as far as solvent effect act as if they were almost completely aromatic in character. Typical distillation data in the particular type I have employed and found very satisfactory is the following:

I. B. P., 142° C.          50 ml., 242° C.
5 ml., 200° C.             55 ml., 244° C.
10 ml., 209° C.            60 ml., 248° C.
15 ml., 215° C.            65 ml., 252° C.
20 ml., 216° C.            70 ml., 252° C.
25 ml., 220° C.            75 ml., 260° C.
30 ml., 225° C.            80 ml., 264° C.
35 ml., 230° C.            85 ml., 270° C.
40 ml., 234° C.            90 ml., 280° C.
45 ml., 237° C.            95 ml., 307° C.

After this material is added, refluxing is continued and, of course, is at a high temperature, to wit, about 160° to 170° C. If the carboxy reactant is an anhydride needless to say no water of reaction appears; if the carboxy reactant is an acid water of reaction should appear and should be eliminated at the above reaction temperature. If it is not eliminated I simply separate out another 10 or 20 cc. of benzene by means of the phase-separating trap and thus raise the temperature to 180° or 190° C., or even to 200° C., if need be. My preference is not to go above about 200° C.

The use of such solvent is extremely satisfactory provided one does not attempt to remove the solvent subsequently except by vacuum distillation and provided there is no objection to a little residue. Actually, when these materials are used for a purpose such as demulsification the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

In the appended table Solvent #7–3, which appears in numerous instances, is a mixture of 7 volumes of the aromatic petroleum solvent previously described and 3 volumes of benzene. This was used, or a similar mixture, in the manner previously described. A large number of the examples indicated employing decalin were repeated, using this mixture and particularly with the preliminary step of removing all the water. If one does not intend to remove the solvent my preference is to use the petroleum solvent—benzene mixture although obviously any of the other mixtures, such as decalin and xylene, can be employed.

The data included in the subsequent tables, i. e., Tables 2 and 3, are self-explanatory, and very complete and it is believed no further elaboration is necessary:

TABLE 2

| Ex. No. of Acid Ester | Ex. No. of Hydroxy Cmpd. | Theo. M. W. of H. C. | Theo. Hydroxyl V. of H. C. | Actual Hydroxyl Value | Mol. Wt. Based on Actual H. V. | Amt. of Hyd. Cmpd. (grs.) | Polycarboxy Reactant | Amt. of Poly-Carboxy Reactant (grs.) |
|---|---|---|---|---|---|---|---|---|
| 1b | 1a | 999 | 112 | 134 | 705 | 200 | Diglycollic acid | 76.0 |
| 2b | 1a | 999 | 112 | 134 | 705 | 200 | Maleic Anhyd | 55.6 |
| 3b | 1a | 999 | 112 | 134 | 705 | 200 | Phthalic Anhyd | 84.0 |
| 4b | 1a | 999 | 112 | 134 | 705 | 200 | Aconitic Acid | 98.7 |
| 5b | 1a | 999 | 112 | 134 | 705 | 200 | Adipic Acid | 83.0 |
| 6b | 2a | 1,830 | 61.2 | 79.3 | 1,416 | 200 | Diglycollic acid | 18.8 |
| 7b | 2a | 1,830 | 61.2 | 79.3 | 1,416 | 200 | Phthalic Anhyd | 23.5 |
| 8b | 2a | 1,830 | 61.2 | 79.3 | 1,416 | 200 | Maleic Anhyd | 16.3 |
| 9b | 2a | 1,830 | 61.2 | 79.3 | 1,416 | 200 | Aconitic Acid | 15.3 |
| 10b | 2a | 1,830 | 61.2 | 79.3 | 1,416 | 200 | Adipic Acid | 20.6 |
| 11b | 2a | 1,830 | 61.2 | 98.5 | 1,136 | 200 | Diglycollic acid | 47.0 |
| 12b | 2a | 1,830 | 61.2 | 98.5 | 1,136 | 200 | Maleic Anhyd | 34.5 |
| 13b | 3a | 2,826 | 39.0 | 77.1 | 1,474 | 200 | Diglycollic Acid | 36.4 |
| 14b | 3a | 2,826 | 39.0 | 77.1 | 1,474 | 200 | Phthalic Anhyd | 40.2 |
| 15b | 3a | 2,826 | 39.0 | 77.1 | 1,474 | 200 | Maleic Anhyd | 26.6 |
| 16b | 3a | 2,826 | 39.0 | 77.1 | 1,474 | 200 | Aconitic Acid | 47.4 |
| 17b | 3a | 2,826 | 39.0 | 77.1 | 1,474 | 200 | Adipic Acid | 39.8 |
| 18b | 4a | 3,725 | 30.0 | 62.5 | 1,794 | 200 | Diglycollic Acid | 14.9 |
| 19b | 4a | 3,725 | 30.0 | 62.5 | 1,794 | 200 | Phthalic Anhyd | 18.4 |
| 20b | 4a | 3,725 | 30.0 | 62.5 | 1,794 | 200 | Maleic Anhyd | 12.9 |
| 21b | 4a | 3,725 | 30.0 | 62.5 | 1,794 | 200 | Aconitic Acid | 11.8 |
| 22b | 4a | 3,725 | 30.0 | 62.5 | 1,794 | 200 | Adipic Acid | 16.2 |
| 23b | 4a | 3,725 | 30.0 | 79.0 | 1,418 | 200 | Diglycollic Acid | 37.8 |
| 24b | 5a | 4,826 | 23.2 | 52.4 | 2,140 | 200 | ....do.... | 12.5 |
| 25b | 5a | 4,826 | 23.2 | 52.4 | 2,140 | 200 | Phthalic Anhyd | 15.5 |
| 26b | 5a | 4,826 | 23.2 | 52.4 | 2,140 | 200 | Maleic Anhyd | 10.8 |
| 27b | 5a | 4,826 | 23.2 | 52.4 | 2,140 | 200 | Aconitic Acid | 10.8 |
| 28b | 5a | 4,826 | 23.2 | 52.4 | 2,140 | 200 | Adipic Acid | 13.6 |
| 29b | 5a | 4,826 | 23.2 | 64.6 | 1,734 | 200 | Diglycollic Acid | 30.8 |
| 30b | 5a | 4,826 | 23.2 | 64.6 | 1,734 | 200 | Maleic Anhyd | 22.5 |
| 31b | 5a | 4,826 | 23.2 | 64.6 | 1,734 | 200 | Adipic Acid | 33.6 |
| 32b | 6a | 5,565 | 20.1 | 46.3 | 2,420 | 200 | Diglycollic Acid | 11.1 |
| 33b | 6a | 5,565 | 20.1 | 46.3 | 2,420 | 200 | Phthalic Anhyd | 13.7 |
| 34b | 6a | 5,565 | 20.1 | 46.3 | 2,420 | 200 | Maleic Anhyd | 9.6 |
| 35b | 6a | 5,565 | 20.1 | 46.3 | 2,420 | 200 | Aconitic Acid | 9.6 |
| 36b | 6a | 5,565 | 20.1 | 46.3 | 2,420 | 200 | Adipic Acid | 12.0 |
| 37b | 6a | 5,565 | 20.1 | 60.2 | 1,860 | 200 | Diglycollic Acid | 28.6 |
| 38b | 6a | 5,565 | 20.1 | 60.2 | 1,860 | 200 | Maleic Anhyd | 21.0 |

TABLE 3

| Ex. No. of Acid Ester | Solvent | Amt. Solvent (grs.) | Esterification Temp., °C. | Time of Esterification (Hrs.) | Water Out (cc.) |
|---|---|---|---|---|---|
| 1b | Decalin | 266 | 200 | 4½ | 8.5 |
| 2b | ....do.... | 256 | 189 | 4¾ | None |
| 3b | ....do.... | 284 | 202 | 15⅔ | 0.8 |
| 4b | ....do.... | 299 | 191 | 2 | 14 |
| 5b | Solvent #7-3 | 274 | 192 | 5½ | 9.9 |
| 6b | Decalin | 213 | 182 | 1¼ | 4.0 |
| 7b | ....do.... | 218 | 197 | 4¾ | 4.0 |
| 8b | ....do.... | 211 | 192 | 2¼ | 2.6 |
| 9b | ....do.... | 211 | 184 | 1½ | 2.4 |
| 10b | ....do.... | 216 | 196 | 5 | 4.2 |
| 11b | Solvent #7-3 | 248 | 203 | 3¾ | 6.5 |
| 12b | ....do.... | 312 | 127 | 3¾ | |
| 13b | Decalin | 232 | 192 | 7 | 5.1 |
| 14b | ....do.... | 274 | 183 | 10¾ | .8 |
| 15b | ....do.... | 246 | 184 | 3 | .5 |
| 16b | ....do.... | 264 | 178 | 2½ | 5.4 |
| 17b | ....do.... | 235 | 187 | 10¼ | 2.2 |
| 18b | ....do.... | 210 | 178 | 1½ | 3.2 |
| 19b | ....do.... | 213 | 191 | 4½ | 3.4 |
| 20b | ....do.... | 208 | 190 | 5 | 3.1 |
| 21b | ....do.... | 208 | 190 | 1½ | 3.0 |
| 22b | ....do.... | 212 | 195 | 8½ | 3.6 |
| 23b | Solvent #7-3 | 232 | 200 | 3¾ | 5.5 |
| 24b | Decalin | 209 | 197 | 4½ | 4.2 |
| 25b | ....do.... | 212 | 187 | 11 | .7 |
| 26b | ....do.... | 208 | 197 | 4¾ | 4.2 |
| 27b | ....do.... | 213 | 189 | 4½ | 4.3 |
| 28b | ....do.... | 210 | 194 | 12½ | 3.5 |
| 29b | ....do.... | 226 | 200 | 8½ | 6.2 |
| 30b | Decalin xylene | 222 | 209 | 7½ | 2.2 |
| 31b | Decalin | 229 | 235 | 8 | 2.5 |
| 32b | ....do.... | 208 | 194 | 9¾ | 1.6 |
| 33b | ....do.... | 211 | 195 | 9½ | 2.5 |
| 34b | ....do.... | 206 | 193 | 3½ | 2.6 |
| 35b | ....do.... | 211 | 191 | 2 | 2.8 |
| 36b | ....do.... | 209 | 195 | 5½ | 6.1 |
| 37b | ....do.... | 223 | 188 | 11 | 5.5 |
| 38b | Decalin xylene | 220 | 171 | 8¾ | 1.2 |

The procedure for manufacturing the esters has been illustrated by preceding examples. If for any reason reaction does not take place in a manner that is acceptable, attention should be directed to the following details: (a) Recheck the hydroxyl or acetyl value of the oxypropylated diol and use a stoichiometrically equivalent amount of acid; (b) if the reaction does not proceed with reasonable speed either raise the temperatures indicated or else extend the priod of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal as the size of the molecule increases and the reactive hydroxyl radical represents a smaller fraction of the entire molecule and thus more difficulty is involved in obtaining complete esterification.

Even under the most carefully controlled conditions of oxypropylation involving comparatively low temperatures and long time of reaction there are formed certain compounds whose composition is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value and conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The intermediate products or liquids prior to esterification are generally pale amber to amber in color, and show moderate viscosity. They can be bleached with bleaching clays, filtering chars, and the like. However, for the purpose of demulsification or the like color is not a factor and decolorization is not justified.

In the above instances I have permitted the solvents to remain present in the final reaction mass. In other instances I have followed the same procedure using decalin or a mixture of decalin and benzene in the same manner and ultimately removed all the solvents by vacuum distillation. Appearances of the final products after esterification are much the same as the diols before esterification and in some instances were somewhat darker in color and had a reddish cast and perhaps somewhat more viscous.

PART 3

Diols such as polypropylene glycol of approximately 2,000 molecular weight, for example, have been esterified with dicarboxy acids and employed as demulsifying agents. On first examination the difference between the herein described products and such comparable products appears to be rather insignificant. In fact, the difference is such that it fails to explain the fact that compounds of the kind herein described may be, and frequently are, 10%, 15% or 20% better on a quantitative basis than the simpler compound previously described, and demulsify faster and give cleaner oil in many instances. The method of making such comparative tests has been described in a booklet entitled "Treating Oil Field Emulsions," used in the Vocational Training Courses, Petroleum Industry Series, of the American Petroleum Institute.

The difference, of course, does not reside in the carboxy acid but in the diol. Momentarily an effort will be made to emphasize certain things in regard to the structure of a polypropylene glycol, such as polypropylene glycol of a 2000 molecular weight. Propylene glycol has a primary alcohol radical and a secondary alcohol radical. In this sense the building unit which forms polypropylene glycols is not symmetrical. Obviously, then, polypropylene glycols can be obtained, at least theoretically, in which two secondary alcohol groups are united or a secondary alcohol group is united to a primary alcohol group, etherization being involved, of course, in each instance.

Usually no effort is made to differentiate between oxypropylation taking place, for example, at the primary alcohol unit radical or the secondary alcohol radical. Actually, when such products are obtained, such as a high molal polypropylene glycol or the products obtained in the manner herein described one does not obtain a single derivative such as $HO(RO)_nH$ in which $n$ has one and only one value, for instance, 14, 15 or 16, or the like. Rather, one obtains a cogeneric mixture of closely related or touching homologues. These materials invariably have high molecular weights and cannot be separated from one another by any known procedure without decomposition. The properties of such mixture represent the contribution of the various individual members of the mixture. On a statistical basis, of course, $n$ can be appropriately specified.

In the instant situation it becomes obvious that if an ordinary high molal propyleneglycol is compared to strings of white beads of various lengths, the diols herein employed as intermediates are characterized by the presence of a black bead, i. e., a radical which corresponds to octyleneglycol or octylenediol as previously described, i. e., the radical

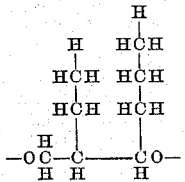

Furthermore, it becomes obvious that one now has a nonsymmetrical radical in the majority of cases for the reason that in the cogeneric mixture going back to the original formula

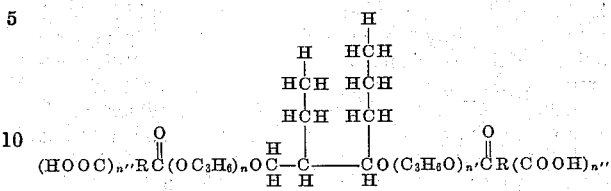

$n$ and $n'$ are usually not equal. For instance, if one introduces 15 moles of propylene oxide, $n$ and $n'$ could not be equal, insofar that the nearest approach to equality is where the value of $n'$ is 7 and $n$ is 8. However, even in the case of an even number such as 20, 30, 40 or 50, it is also obvious that $n$ and $n'$ will not be equal in light of what has been said previously. Both sides of the molecule are not going to grow with equal rapidity, i. e., to the same size. Thus the diol herein employed is differentiated from polypropylene diol 2000, for example, in that (a) it carries a hetero unit, i. e., a unit other than a propylene glycol or propylene oxide unit, (b) such unit is off center, and (c) the effect of that unit, of course, must have some effect in the range with which the linear molecules can be drawn together by hydrogen binding or van der Waals forces, or whatever else may be involved.

What has been said previously can be emphasized in the following manner. It has been pointed out previously that in the last formula immediately preceding, $n$ or $n'$ could be zero. Under the conditions of manufacture as described in Part 1 it is extremely unlikely that $n$ is ever zero. However, such compounds can be prepared readily with comparatively little difficulty by resorting to a blocking effect or reaction. For instance, if the octylene diol is esterified with a low molal acid such as acetic acid mole for mole and such product subjected to oxyalkylation using a catalyst, such as sodium methylate and guarding against the presence of any water, it becomes evident that all the propylene oxide introduced, for instance 15 to 80 molecules per polyhydric alcohol molecule necessarily must enter at one side only. If such product is then saponified so as to decompose the acetic acid ester and then acidified so as to liberate the water-soluble acetic acid and the water-insoluble diol a separation can be made and such diol then subjected to esterification as described in Part 2, preceding. Such esters, of course, actually represent products where either $n$ or $n'$ is zero. Also intermediate procedures can be employed, i. e., following the same esterification step after partial oxypropylation. For instance, one might oxypropylate with one-half the ultimate amount of propylene oxide to be used and then stop the reaction. One could then convert this partial oxypropylated intermediate into an ester by reaction of one mole of acetic acid with one mole of a diol. This ester could then be oxypropylated with all the remaining propylene oxide. The final product so obtained could be saponified and acidified so as to eliminate the water-soluble acetic acid and free the obviously unsymmetrical diol which, incidentally, should also be kerosene-soluble.

From a practical standpoint I have found no advantage in going to this extra step but it does emphasize the difference in structure between the herein described diols employed as intermediates and high molal polypropylene glycol, such as polypropylene glycol 2000.

PART 4

Previous reference has been made to other oxyalkylating agents other than propylene oxide, such as ethylene oxide. Obviously variants can be prepared which do not depart from what is said herein but do produce modifications. The diol 2-ethylhexandiol-1,3 can be reacted with ethylene oxide in modest amounts and then subjected to oxypropylation provided that the resultant derivative is (a) water-insoluble, (b) kerosene-soluble, and (c) has present 15 to 80 alkylene oxide radicals. Needless to say, in order to have water-insolubility and kerosene-solubility the large majority must be propylene oxide. Other variants suggest themselves as, for example, replacing propylene oxide by butylene oxide.

More specifically then one mole of 2-ethylhexandiol-1,3 can be treated with 2,4 or 6 moles of ethylene oxide and then treated with propylene oxide so as to produce a water-insoluble, kerosene-soluble diol in which there are present 15 to 80 oxide radicals as previously specified. Similarly the propylene oxide can be added first and then the ethylene oxide, or random oxyalkylation can be employed using a mixture of the two oxides. The compounds so obtained are readily esterified in the same manner as described in Part 2, preceding. Incidentally, the diols described in Part 1 or the modifications described therein can be treated with various reactants such as glycide, epichlorohydrin, dimethyl sulfate, sulfuric acid, maleic anhydride, ethylene imine, etc. If treated with epichlorohydrin or monochloroacetic acid the resultant product can be further reacted with a tertiary amine such as pyridine, or the like, to give quaternary ammonium compounds. If treated with maleic anhydride to give a total ester the resultant can be treated with sodium bisulfite to yield a sulfosuccinate. Sulfo groups can be introduced also by means of a sulfating agent as previously suggested, or by treating the chloroacetic acid resultant with sodium sulfite.

I have found that if such hydroxylated compound or compounds are reacted further so as to produce entirely new derivatives, such new derivatives have the properties of the original hydroxylated compound insofar that they are effective and valuable demulsifying agens for resolution of water-in-oil emulsions as found in the petroleum industry, as break inducers in doctor treatment of sour crude, etc.

This application is a division of my copending application Serial No. 179,398, filed August 14, 1950, now U. S. Patent No. 2,602,065.

Having thus described my invention, what I claim as new and desire to secure by Letters Patent, is

1. Hydrophile synthetic products; said hydrophile synthetic products being characterized by the following formula:

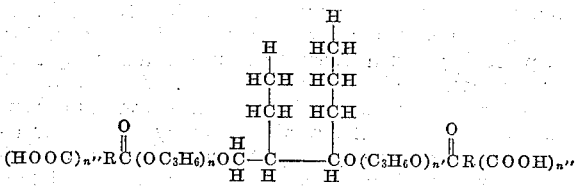

in which $n$ and $n'$ are numerals including 0 with the proviso that $n$ plus $n'$ equals a sum varying from 15 to 80, and $n''$ is a whole number not over 2, and R is a radical of a polycarboxy acid selected from the group consisting of acyclic and isocyclic polycarboxy acids having not more than 8 carbon atoms and composed of carbon, hydrogen and oxygen of the formula:

in which $n''$ has its previous significance; and with the further proviso that the parent diol prior to esterification be water-insoluble and kerosene-soluble.

2. Hydrophile synthetic products; said hydrophile synthetic products being characterized by the following formula:

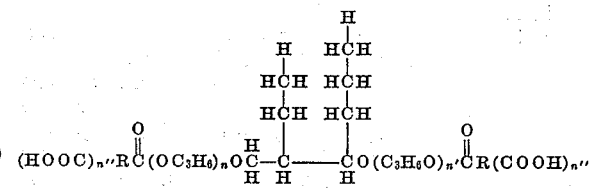

in which $n$ and $n'$ are numerals excluding 0 with the proviso that $n$ plus $n'$ equals a sum varying from 15 to 80, and $n''$ is a whole number not over 2, and R is a radical of a polycarboxy acid selected from the group consisting of acyclic and isocyclic polycarboxy acids having not more than 8 carbon atoms and composed of carbon, hydrogen and oxygen of the formula:

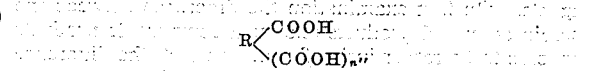

in which $n''$ has its previous significance; and with the further proviso that the parent diol prior to esterification be water-insoluble and kerosene-soluble.

3. Hydrophile synthetic products; said hydrophile synthetic products being characterized by the following formula:

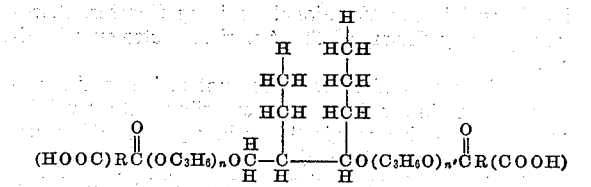

in which $n$ and $n'$ are numerals excluding 0 with the proviso that $n$ plus $n'$ equals a sum varying from 15 to 80, and R is the radical of a dicarboxy acid selected from the group consisting of acyclic and isocyclic dicarboxy acids having not more than 8 carbon atoms and composed of carbon, hydrogen and oxygen of the formula:

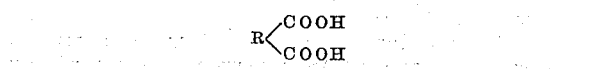

and with the further proviso that the parent diol prior to esterification be water-insoluble and kerosene-soluble.

4. The product of claim 3 wherein the dicarboxy acid is phthalic acid.

5. The product of claim 3 wherein the dicarboxy acid is maleic acid.

6. The product of claim 3 wherein the dicarboxy acid is succinic acid.

7. The product of claim 3 wherein the dicarboxy acid is citraconic acid.

8. The product of claim 3 wherein the dicarboxy acid is diglycollic acid.

References Cited in the file of this patent

UNITED STATES PATENTS

| Number | Name | Date |
|---|---|---|
| 2,357,933 | De Groote | Sept. 12, 1944 |
| 2,448,664 | Fife | Sept. 7, 1948 |
| 2,549,434 | De Groote | Apr. 17, 1951 |
| 2,554,667 | De Groote | May 29, 1951 |
| 2,562,878 | Blair | Aug. 7, 1951 |